United States Patent [19]

Childress et al.

[11] 4,313,243
[45] Feb. 2, 1982

[54] SLIDING WEDGE CABLE CLAMP

[76] Inventors: Ray R. Childress; Stephen R. Childress, both of P.O. Box 853, Richlands, Va. 24641

[21] Appl. No.: 29,372

[22] Filed: Apr. 12, 1979

[51] Int. Cl.³ ............................................. F16G 11/04
[52] U.S. Cl. ............................... 24/136 K; 24/115 M; 403/16; 403/211; 403/374
[58] Field of Search ............ 24/115 M, 115 R, 136 K, 24/136 R; 403/211, 210, 374, 16

[56] References Cited

U.S. PATENT DOCUMENTS

| | | | |
|---|---|---|---|
| 1,154,916 | 9/1915 | Evans | 24/136 R |
| 2,085,333 | 6/1937 | Reynolds | 403/211 |
| 2,325,491 | 7/1943 | Elliott | 403/16 |
| 3,335,470 | 8/1967 | Baer | 403/211 |

FOREIGN PATENT DOCUMENTS 719916 12/1954 United Kingdom ................ 403/211

Primary Examiner—Roy D. Frazier
Assistant Examiner—Alexander Grosz
Attorney, Agent, or Firm—Littlepage & Webner

[57] ABSTRACT

A bight of a cable is wrapped around a sliding wedge thimble which, when one or both of the cable parts is pulled, jams the cable parts between convergent sides of the wedge thimble and opposed convergent sides of a casing. A key, when engaged through registering keyways of the wedge thimble and casing, limits the sliding movement of the wedge thimble so that the latter does not jam the cable parts but, rather, permits the cable to slip lengthwise around it. The key is tapered, and the keyways are so arranged that they serve to unjam the cable when the key is forced through the keyways.

1 Claim, 5 Drawing Figures

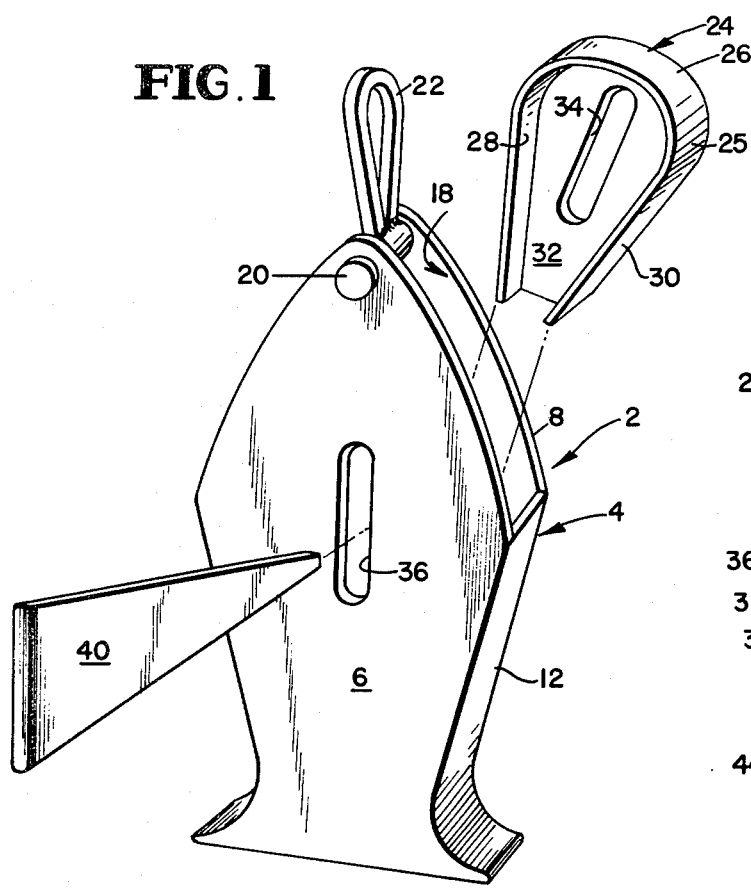
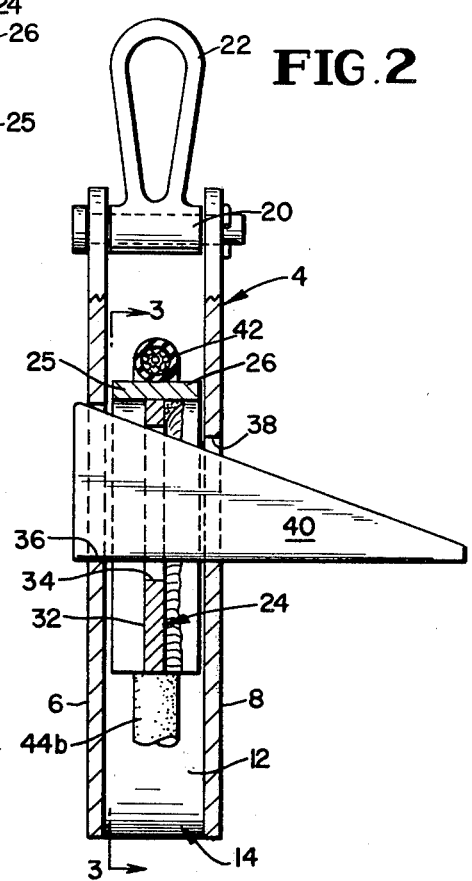
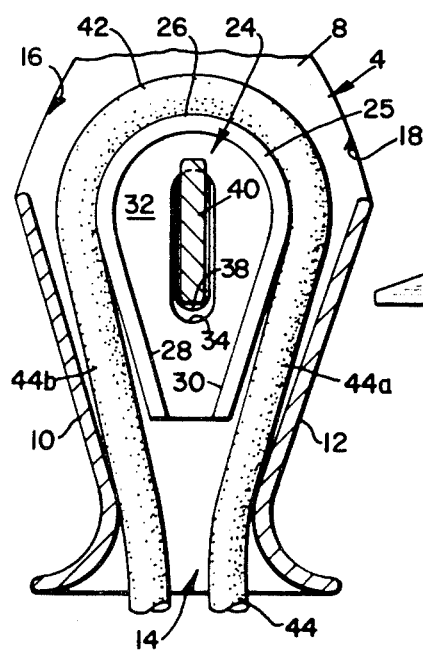
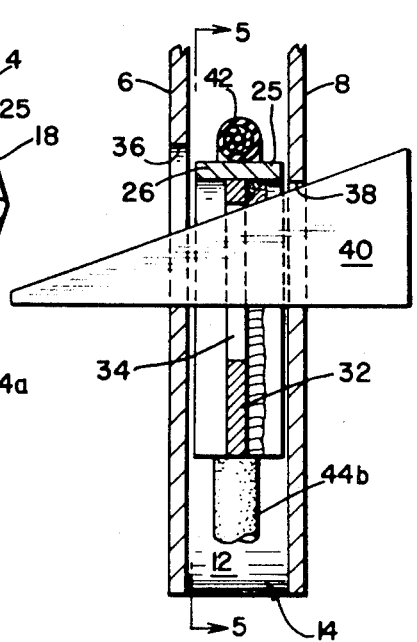
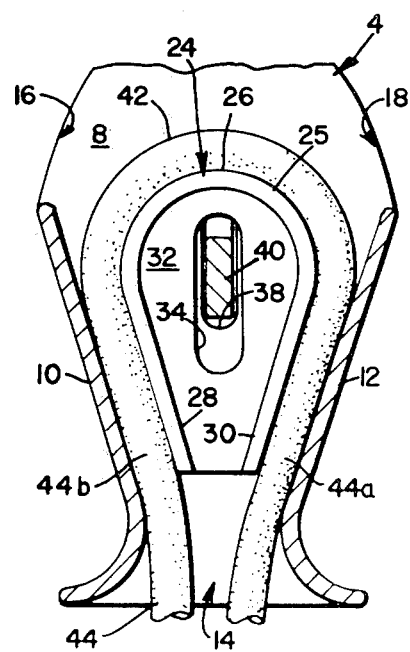

and gaps 16 and 18 between the upper ends of the side walls 10 and 12 and a pintle 20 to which an eye 22 is connected. It will be understood that the clamp casing can be suitably suspended by hook or a tension member roved through eye 22.

SLIDING WEDGE CABLE CLAMP

FIELD OF INVENTION

Buckles, buttons, clasps, etc., cord and rope holders, sliding wedge.

PRIOR ART

U.S. Pat. Nos. to Blackburn 1,090,377; Page 1,379,311; to Hyatt 2,540,887; Ropers 3,905,711; British Pat. No. to Sandford 111,028; British Pat. No. to Sandford 107,636.

OBJECTS

Sliding wedge cable clamps, wherein a cable bight is turned around a slidable wedge thimble and jammed between the wedge thimble and casing are well known. Means have been provided for maintaining such a wedge thimble in inoperative position so that a cable can be slipped through the clamp, specifically, in British Pat. Nos. 107,636 and 111,028. A spike insertable through holes in opposite sides of the clamp casing and through an aperture through the wedge thimble have been disclosed. However, insofar as is known, there have been no such means usable not only for maintaining the wedge thimble in non-jamming position but also usable for disengaging the wedge thimble from jamming position against the cable.

The object of this invention is to provide a means for disengaging the wedge thimble or sliding wedge of a cable clamp, which is operable even though the cable may be under considerable tension, wherein the self-jamming forces of the wedge thimble are very great. To this end it is now intended to provide elongate slots through opposed side walls of a sliding wedge thimble cable clamp casing, and an elongate slot through the wedge thimble wherein, during all normal operations of the clamp, the slot in the wedge thimble registers with the slots in the side walls of the clamp casing, and elongate relatively narrow tapered key engageable through the slots for forcing and maintaining the thimble away from its cable-jamming position. By this means a mechanical advantage can be exerted against the wedge thimble to overcome the self-jamming forces imposed thereon by a clamped cable under tension.

These and other objects will be apparent from the following specification and drawing, in which FIG. 1 is a perspective exploded view of the clamp casing, thimble, and wedge;

FIG. 2 is a vertical cross-section through the clamp assembly showing the wedge thimble maintained in non-jamming position by means of the key inserted through the slots in the casing and wedge thimble;

FIG. 3 is a cross-section along the lines 3—3 of FIG. 2;

FIG. 4 is a view generally similar to FIG. 2 but showing the wedge thimble positioned for maintaining the wedge thimble in a position wherein a cable can slip around it under frictional resistance; and FIG. 5 is a cross-section along the lines 5—5 of FIG. 4.

Referring now to the drawings, in which like reference numerals denote similar elements, the sliding wedge cable clamp 2 is comprised of a generally flat casing 4 having wide parallel side walls 6 and 8 spaced from one another and joined by end walls 10 and 12. The casing thus formed as an open mouth 14 at its bottom (through which the bight of a cable is insertable), A wedge thimble 24 is comprised of a generally flat peripheral band 25 having a generally arcuate top 26 and convergent sides 28 and 30. Band 25 is welded or otherwise secured to a web 32 through which an elongate slot 34 extends. Casing side wall 6 has a relatively long keyway 36 therethrough and the casing side wall 8 has a relatively short keyway 38 therethrough. These keyways 36 and 38 are opposite one another so that an elongate narrow tapered key 40 can be inserted through them in either direction.

In operation, key 40 and thimble 24 are removed (as in FIG. 1), the bight 42 of a cable 44 is inserted through the open mouth 14 of casing 4, the cable bight is passed out through one of gaps 16 or 18, wedge thimble 24 is inserted in the cable bight, and the cable is pulled so as to draw the cable bight and wedge thimble into the interior of the casing. Tension on the cable will, of course, draw the wedge thimble downwardly into the casing so that the standing parts 44(a) and 44(b) of the cable are wedged tightly between the convergent sides 28 and 30 of the wedge thimble band and the opposed inner surfaces of casing sides 10 and 12. The more tension applied to the cable, the more self-jamming forces are applied to the wedge thimble. This action is characteristic of sliding wedge cable clamps of this general type. It is noteworthy that at all times when a cable such as cable 44 is clamped between the wedge thimble and the casing sides, the elongate keyway 34 in wedge thimble 24 is disposed between the slots 36 and 38 in the casing side walls so that the tapered key 40 can be driven in, thereby to force the wedge thimble to the non-jamming position of FIGS. 2 and 3. If, instead of inserting the small end of key 40 first through keyway 36 in casing wall 6, it is desired to drive the wedge thimble to a position intermediate its full-wedging position and its full inoperative position, the key may be inserted through the shorter keyway 38 in casing side wall 8 (FIGS. 4 and 5), wherein it holds off the wedge thimble so that it applies no or only relatively small clamping forces against the cable. This is because the keyway 38 is shorter than keyway 36 and key 40 cannot be extended as far through the keyway as it can when the wedge is inserted through keyway 36. The lengths of both keyways 36 and 38 are such that the wide end of the tapered key cannot enter the casing interior, in which case it would be extremely difficult to extricate.

I claim:

1. A sliding wedge cable clamp comprising,
    a casing having opposed flat front and rear sides and opposed convergent ends connecting said sides,
    said casing having an open mouth between the convergent ends providing an entry through which the bight and adjacent standing parts of a cable may be inserted,
    a wedge thimble slidable in said casing, said wedge thimble having a rounded end adapted to be engaged in the cable bight and convergent sides respectively opposite the convergent sides of the casing whereby application of tension to one of the standing parts of the cable tends to move the wedge thimble so that the convergent sides thereof move towards the convergent sides of the casing whereby to apply forces tending to jam the standing parts of the cable between the wedge thimble sides and the casing sides, said front and rear walls of said casing and said wedge thimble having registering keyway slots therethrough, and a tapered key engaging through said keyway slots, said key comprising an elongate, flat, generally right-triangular member having a relatively short side corresponding to the base of the triangle, one side at right angles to the end and corresponding to the altitude of the triangle, and a diagonal side corresponding to the hypotenuse of the triangle and converging with said one side at an apex whereby, upon insertion of the key through said keyway slots with the diagonal side of the key disposed away from the mouth of the casing, said wedge thimble is cammed so that the convergent sides thereof move away from the convergent sides of the casing, both of said keyway slots in the casing walls being shorter in length than the end of the key whereby engagement of the diagonal side of the key against an end of either keyway slot in the casing walls prevents the end of the key from entering the interior of the casing, one of the keyway slots in the casing wall being shorter than the other keyway slot in the other casing wall whereby when the apex of the key is inserted first through the shorter slot, the length of insertion thereof is limited to a greater extent than when the apex of the key is inserted through the longer slot, so that the maximum spacing between the convergent sides of the wedge and the convergent ends of the casing is less when the apex of the key is inserted first through the shorter slot than when it is inserted first through the longer slot.

* * * * *